United States Patent [19]

Muth et al.

[11] 4,348,674
[45] Sep. 7, 1982

[54] APPARATUS AND METHOD FOR CLASSIFYING MOVING TARGETS

[75] Inventors: Klaus Muth, Icking; Philipp Federspieler, Hohenschaeftlarn, both of Fed. Rep. of Germany

[73] Assignee: Siemens Aktiengesellschaft, Berlin & Munich, Fed. Rep. of Germany

[21] Appl. No.: 165,296

[22] Filed: Jul. 2, 1980

[30] Foreign Application Priority Data

Jul. 18, 1979 [DE] Fed. Rep. of Germany ....... 2928907

[51] Int. Cl.³ ............................................. G01S 13/58
[52] U.S. Cl. ................................................... 343/5 SA
[58] Field of Search ....................................... 343/5 SA

[56] References Cited

U.S. PATENT DOCUMENTS

| | | | |
|---|---|---|---|
| 1,981,884 | 11/1934 | Taylor et al. | 343/5 SA X |
| 3,733,603 | 5/1973 | Johnston | 343/5 SA |
| 3,882,495 | 5/1975 | Bolger | 343/5 SA X |
| 3,896,434 | 7/1975 | Sirven | 343/5 SA |
| 3,983,558 | 9/1976 | Rittenbach | 343/5 SA X |
| 4,001,820 | 1/1977 | Rosenbaum et al. | 343/5 SA |
| 4,053,891 | 10/1977 | Opitz | 343/5 SA |
| 4,101,890 | 7/1978 | Goyard | 343/5 SA X |
| 4,275,396 | 6/1981 | Jacomini | 343/5 SA |

*Primary Examiner*—T. H. Tubbesing
*Attorney, Agent, or Firm*—Hill, Van Santen, Steadman, Chiara & Simpson

[57] ABSTRACT

Method and apparatus for passive classification of moving targets which uses pulse Doppler radar wherein in addition to the primary Doppler echo the radar echo signals of the moving targets also contain periodically repeating Dopplers side line frequencies which can be utilized for classification of the targets. These Doppler side lines occur because of the periodic change of reflectivity of the target as, for example, due to rotating parts on the target and in the invention are investigated by means of spectral analysis for identification of the target. For example, land vehicles, wheeled and track vehicles can be easily distinguished with the invention and a first rough evaluation and in a fine detail evaluation, can be classified for every target type.

5 Claims, 3 Drawing Figures

4,348,674

APPARATUS AND METHOD FOR CLASSIFYING MOVING TARGETS

BACKGROUND OF THE INVENTION

1. Field of the Invention

This invention relates in general to apparatus and method for classifying moving targets using Doppler radar so as to identify the targets.

2. Description of the Prior Art

In various military uses, it is necessary to distinguish between various target catagories for the identification of targets with the use of radar. With battlefield radar units presently in use, a radar observer can generally distinguish between wheel vehicles, track vehicles and personnel by means of acoustical Doppler evaluation. Only particularly well-trained radar observers are occasionally successful in making finer distinctions within these target categories. Due to the very complex Doppler noise, a more detailed classification, however, using present techniques gives rise to considerable uncertainties.

SUMMARY OF THE INVENTION

The present invention detects the primary Doppler line so as to determine the momentary velocity of the primary reflection centers of a vehicle being detected. In addition, the radar echoes contain additional informational components in the fine structure of the frequency spectrum which can be attributed to particular properties of the reflecting target.

The object of the invention is to provide an apparatus which used with a Doppler radar unit allows definite identification of possible targets and which utilizes target spectral analysis of the radar Doppler echoes. The object of the invention is achieved in that the echo signals of moving targets are investigated by means of spectral analysis so as to detect not only the primary Doppler reflection but also the periodic side frequency lines of the Doppler frequency spectrum which are generated due to periodic change of the reflection characteristics of the target and are generated by parts of the target and wherein the side line frequency characteristics are used for classifying the target by evaluating them.

An investigation of the spectral components of the Doppler echo signals for modulation of the Doppler echo signals typical for specific targets is possible in this manner. The modulation of the Doppler echo signals can occur because parts of the targets that reflect to various degrees execute movements relative to the main portion of the body of the target.

According to an advantageous further development of the invention, for example, for the classification of track vehicles spectral side frequency lines caused by reflections from the track elements as a function of their size and relative velocity in relation to the vehicle main reflection can be selected and analyzed.

Other objects, features and advantages of the invention will be readily apparent from the following description of certain preferred embodiments thereof taken in conjunction with the accompanying drawings although variations and modifications may be affected without departing from the spirit and scope of the novel concepts of the disclosure and in which:

DESCRIPTION OF THE PREFERRED EMBODIMENTS

Figure 1:
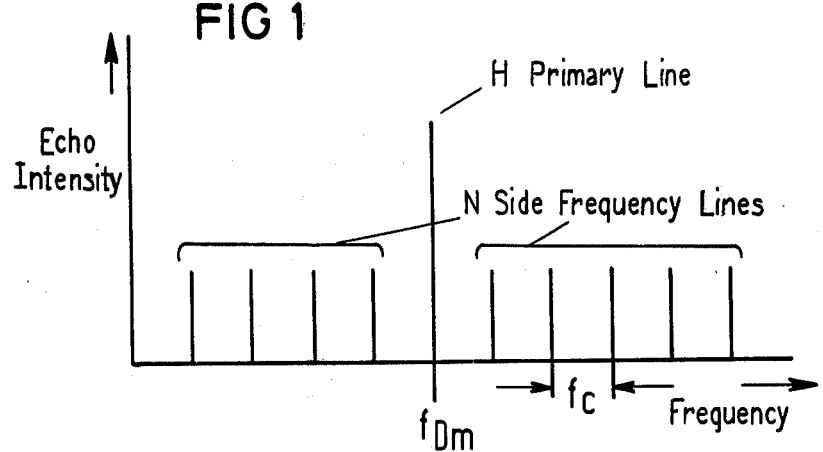
FIG. 1 illustrates a plot of a frequency spectrum detected by the radar system of the invention from a moving target.

FIG. 1 illustrates a sample plot of a Doppler frequency spectrum from a moving target wherein the primary Doppler line H has a frequency of $f_{DM}$ which is reflected from the primary target and in addition includes a plurality of periodically repeating side frequency lines N which are spaced from each other and from the primary Doppler line by frequency intervals of $f_c$. The side frequency lines N are generated due to periodic changes of the reflection factor due for example, to rotating parts on the vehicle. For example, if the vehicle is a tank, the principal Doppler reflection line H is proportional in frequency to the mean velocity of the tank and the side frequency lines N are reflected from various moving parts of the vehicle such as the endless track, for example.

Figure 2:
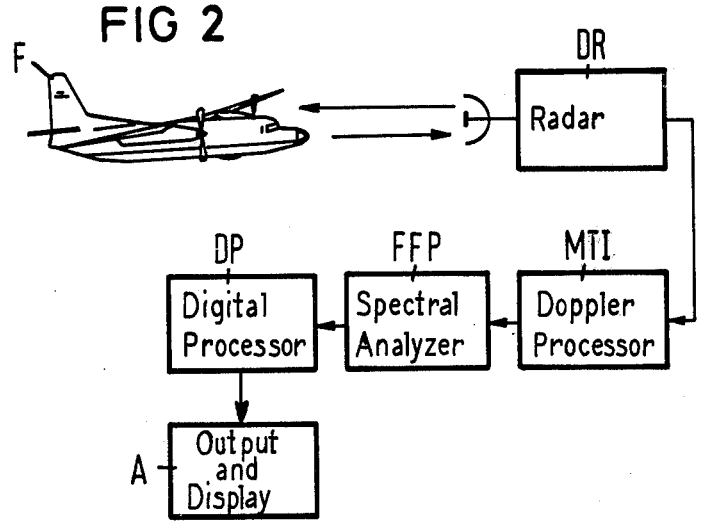
FIG. 2 illustrates the radar system of the invention and used to detect a moving target.

FIG. 2 illustrates the apparatus and method of the invention which can be used for target classification and is illustrated with a flying object F in this instance, an aircraft which is being detected by a Doppler radar unit DR which transmits the signal and receives the radar echoes and detects it and supplies an output to a moving target indicator unit MTI which processes the received echoes and supplies them to a spectral analyzer FFP which makes a spectral analysis of the reflected signal utilizing a fast Fourier process. The output of the spectral analyzer unit FFP is in the form of digital output signals which are supplied to a digital processor DP which supplies an output to a display device A wherein a presentation such as shown in FIG. 1 can be displayed, for example, on a cathode ray tube or in another fashion, but mainly gives an alphanumeric readout of the type of target.

The classification of the moving targets in the digital processor DP occurs in a plurality of steps. First, a qualitative evaluation of the spectrum is made for the purpose of eliminating unuseable spectral components which are disrupted, noise containing blurred or which occur on an unsuitable presentation scale.

A rough classification of specific target categories such as airborne vehicles, land vehicles, water vehicles and projectiles then occurs.

Subsequently, an identification and measurement of the most important magnitudes of the spectrum to be investigated such as the frequency and intensity of the primary Doppler line $f_{Dm}$ and the frequency spectrum separation of the most important side lines $f_c$ is determined. A calculation of the identification features or feature for example, the track-element length of given armored vehicles is then made with these values for identifying the individual target type within the respective rough classification. By comparing the identification features to stored characteristic values of previously known targets in the digital processor DP, the specific classification can be made and the results can be displayed on the display means A. For cases in which an allocation is not yet possible, the new target can be entered into a target catalog and the operating personnel of the unit can be provided with an appropriate indication.

Figure 3:
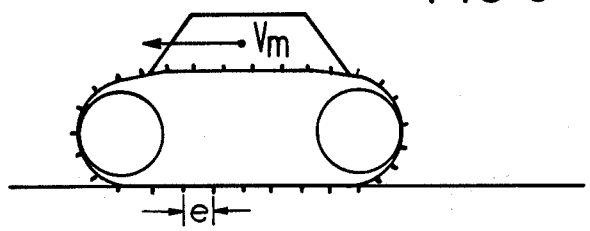
FIG. 3 is a schematic illustration of a track vehicle to give an example of a particular classification and identification.

To illustrate how the invention works, the track vehicle illustrated in side view in FIG. 3 can be considered. Let it be assumed that the track vehicle is moving with a mean velocity of Vm and that it has an endless track with equally spaced lugs which are spaced apart by a distance e. FIG. 1 can be taken as an illustration of the principal reflection and the side line reflections N received from such a vehicle.

In track vehicles, the radar reflecting parts moving relative to the body of the vehicle are particularly clearly defined. On the basis of such a track vehicle, it will be subsequently disclosed how it is possible by use of using mensuration measurements to define and make fine distinctions so as to classify different track vehicles with assistance of the measurable Doppler frequency spectrum which results from the particular dimensions of the vehicle as well as the spacing of the lugs on the endless track.

Utilizing the assumption that every length of the chain or track has at least one lug which is at least one superior point of reflection which is separable from the next chain link and lug by a distance interval of e and further assuming that changes in the path of the motion of the reflection cross-section of the individual link occurs, the Doppler spectrum of the track vehicle will include a plurality of characteristic harmonic side frequency lines which are separated in frequency by $f_c$ in the frequency spectrum detected by the Doppler radar. The following relationships exist between the frequency separations $f_c$ of the harmonic side frequency lines and the mean frequency velocity line $V_m$ $$f_c = (V_m/e) \quad (1)$$

In analyzing the Doppler spectrum for track vehicles, it is therefore possible to determine the separation e of the individual links of the endless chain and thus to distinguish between track vehicles which have different size chain links or track elements.

Thus, according to the invention with the use of a Doppler radar and an evaluation unit which is attached to the output of the Doppler radar, the length of the chain link or track element e of a track vehicle can be determined in the following manner:

1. The frequency separation $f_c$ of the harmonic side lines and the frequency $f_{Dm}$ are determined from the Doppler spectrum.
2. The mean vehicle velocity $V_m$ can be calculated from the frequency $$f_{Dm} = \frac{2V_m}{\lambda} \quad (2)$$

$$V_m = \frac{f_{Dm} C_o}{2 f_s} \quad (3)$$

$$\lambda = \frac{f_s}{C_o} \quad (4)$$

Where $f_s$ is the transmission frequency of the radar unit and $C_o$ is the velocity of light.

3. The length of the individual chain link or track element thus can be calculated:

$$e = \frac{f_{Dm} C_o}{f_c 2 f_s \cos\alpha} \quad (5)$$

Thereby, $\alpha$ indicates the angle between the track vector of the vehicle and the connecting line between the radar and the vehicle. This angle $\alpha$ can either be measured by evaluation of subsequent position data of the target given by the radar or can be estimated optically by the observer.

A numerical example follows:

Given a frequency separation $f_c$ of the harmonic side lines, the following equations can be derived:

$$\frac{1}{f_c} = \frac{e}{V_m}; \quad (6)$$

$$e = \frac{V_m}{f_c} \quad (7)$$

The calculation is based on the following values:

$$f_s = 9.5 \text{ GHz}; f_{Dm} = 328 \text{ Hz}; f_c = 29.5 \text{ Hz} \quad (8)$$

$$e = \frac{C_o f_{Dm}}{f_s 2 f_c} = 3.16 \text{ cm} \frac{f_{Dm}}{f_c^2} = 17.5 \text{ cm}$$

Thus, the length of a chain link or track element is equal e=17.5 cm.

The employment of a fast Fourier analyzer is helpful for the spectral analysis. The output signals occur in digital form. It is therefore expedient to carry out the classification—potentially automatically—with a special digital processor.

Thus, in the present invention, the detected Doppler radar echo is processed and analyzed so as to identify the particular vehicle which is being detected by the system.

Although the invention has been described with respect to preferred embodiments, it is not to be so limited as changes and modifications may be made which are within the full intended scope of the invention as defined by the appended claims.

We claim as our invention:

1. Apparatus for identifying targets comprising, a Doppler radar which transmits and receives radient energy to detect a primary Doppler frequency line and a plurality of frequency spaced side Doppler frequency lines, and means for processing and analyzing said primary and side Doppler lines to identify a target.

2. Apparatus according to claim 1 wherein said processing and analyzing means includes a Doppler processor, a spectral analyzer and a display means.

3. Apparatus according to claim 2 wherein said processing and analyzing means also includes a digital processor.

4. A method for identifying targets comprising the steps of transmitting and receiving with a radar transceiver Doppler radar signals, detecting from said received signals a primary Doppler frequency line and a plurality of frequency spaced side Doppler frequency lines, and analyzing said primary and side Doppler lines to identify a target.

5. A method according to claim 4 wherein said step of analyzing occurs in a digital processor DP which identifies in a rough classification within target categories whether they are aircraft or land vehicles or projectiles and then makes a fine classification in said digital processor DP of the periodic secondary lines in the Doppler frequency spectrum determined by spectral analysis which are compared in said digital processor DP to identify a target type within a target category, such as for example, a jet aircraft, or a half-track vehicle based on the frequency and intensity of the principal Doppler line of the target echo as well as the frequency spacing of characteristic secondary lines in the Doppler frequency spectrum.

* * * * *